C. B. McLAUGHLIN.
WHEELED FOOTSTOOL.
APPLICATION FILED SEPT. 2, 1916.
1,248,358.
Patented Nov. 27, 1917.
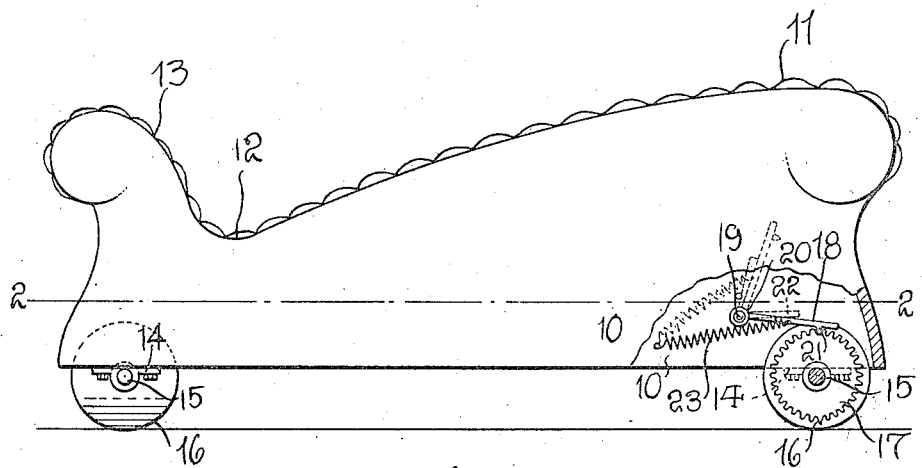
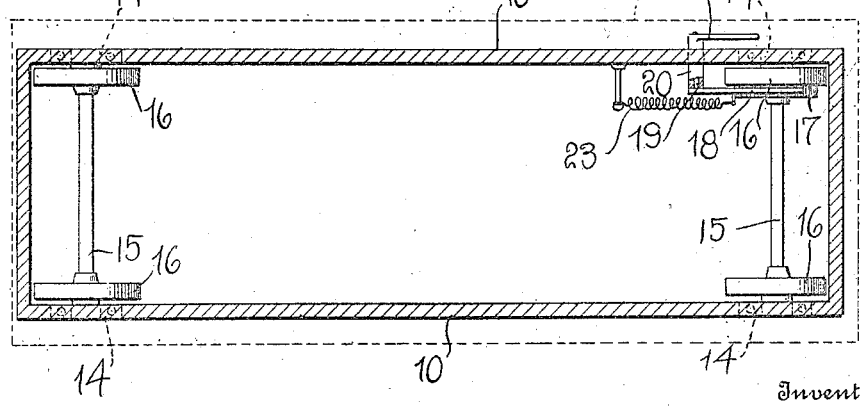
Inventor
C. B. McLaughlin
By Watson E. Coleman
Attorney

UNITED STATES PATENT OFFICE.

CLARK B. McLAUGHLIN, OF LOVELAND, OHIO.

WHEELED FOOTSTOOL.

1,248,358.

Specification of Letters Patent.

Patented Nov. 27, 1917.

Application filed September 2, 1916. Serial No. 118,290.

*To all whom it may concern:*

Be it known that I, CLARK B. McLAUGHLIN, a citizen of the United States, residing at Loveland, in the county of Clermont and State of Ohio, have invented certain new and useful Improvements in Wheeled Footstools, of which the following is a specification, reference being had to the accompanying drawings.

This invention relates to footstools and the general object of the invention is the provision of a footstool mounted on wheels so that it may be used by a person who is rocking and will shift back and forth as the person rocks.

A further object is to provide means for locking the wheels so that the footstool may be used in the ordinary manner.

In rocking, the body is rested but the legs and ankles become very weary in the course of time.

The device which I will hereafter describe is intended to relieve this difficulty by moving back and forth in consonance with the rocker. The shape of the foot stool is such that the legs are supported below the knees and the feet and toes are also supported without any forward or side strain on the ankles.

The invention is illustrated in the accompanying drawings, in which—

Figure 1 is a side elevation of my improved foot stool partly broken away to show the internal mechanism;

Fig. 2 is a section on the line 2—2 of Fig. 1.

Referring to these drawings it will be seen that this footstool comprises a frame having side pieces 10, the footstool being formed with an upholstered cushion 11. This cushion as illustrated extends downward and toward the forward end of the frame so as to form a depression 12 and then extends upward and forward in a curve. This form for the cushioned top of the footstool provides for the support of the foreleg, and the heels of the feet rest in the depression 12, while the foot itself is supported against the upwardly extending portion 13.

The frame is provided with forward and rear bearings 14 in which are disposed the axles 15 carrying the wheels 16. Means are provided for locking one set of these wheels so as to prevent the reciprocation of the footstool and as a means for accomplishing this end I mount upon one of the axles, as for instance the rear axle, the toothed wheel 17. Coacting with this wheel is a dog 18 whose rear end is mounted upon a transversely extending shaft 19 passing through a sleeve 20 which extends through one side wall 10 which forms a bearing for the shaft 19. The dog 18 is rigidly attached to the shaft 19 and is formed with a detent tooth 21 engageable with the teeth of the gear wheel. To the outer end of the shaft is attached a radially disposed key 22, whereby the shaft may be turned so as to carry the dog into or out of its operative position.

For the purpose of holding the dog either in its operative or inoperative position I provide a spring 23, which is illustrated as a coil spring attached to the side wall in any suitable manner and pivotally connected to the dog 18 intermediate the ends of the dog. This spring is so disposed that it is thrown beyond the center or axis of the shaft 19 when the dog is turned either to its operative or inoperative position. Thus the spring will urge the dog toward the stop 24 and hold it against the stop or when the dog is thrown over beyond its center, the spring will urge the dog toward the face of the gear wheel. It will be seen that this construction is very simple and thoroughly effective. It is obvious of course that if necessary the gear wheel may be duplicated upon the opposite end of the rear shaft or may be also disposed upon the forward shaft.

Preferably the wheels 16 will be provided with rubber tires, thus not only preventing the wheels from marring the floor over which they roll, but also causing the wheels to frictionally engage with the floor when the wheels are locked and thus resist any tendency of the footstool to shift.

While I have illustrated a form of my invention which I believe to be thoroughly practical, I wish it understood that the details of the construction may be modified in many ways without departing from the spirit of the invention.

Having described my invention, what I claim is:

A foot stool comprising a supporting frame, shafts supported in bearings on the frame and carrying wheels, means for locking one of said shafts from rotation and including a member disposed on the exterior of the foot stool, and a foot and leg support mounted upon the frame, the upper face of the support extending longitudinally downward to form a support for the leg and then extending upward to a height approximately the same as the highest point of the leg support.

In testimony whereof I hereunto affix my signature in the presence of two witnesses.

CLARK B. McLAUGHLIN.

Witnesses:
G. M. McLAUGHLIN,
A. R. McLAUGHLIN.

Copies of this patent may be obtained for five cents each, by addressing the "Commissioner of Patents, Washington, D. C."